United States Patent [19]

Bloore

[11] Patent Number: 4,891,500
[45] Date of Patent: Jan. 2, 1990

[54] SELF-HEALING PARALLEL HEATING TAPE

[76] Inventor: Frederick W. Bloore, 27 Quail Green, Wightwick, Wolverhampton, West Midlands WV6 8DF, United Kingdom

[21] Appl. No.: 239,902

[22] Filed: Sep. 2, 1988

[30] Foreign Application Priority Data

Sep. 5, 1987 [GB] United Kingdom ............... 8720898

[51] Int. Cl.4 ............................................. H05B 1/02
[52] U.S. Cl. .................................... 219/505; 219/504; 219/483; 219/535; 219/549; 361/106
[58] Field of Search ............... 219/504, 505, 212, 494, 219/483, 497, 501, 508, 509, 535, 549; 361/27, 29, 24, 93, 58, 106; 307/117

[56] References Cited

U.S. PATENT DOCUMENTS

| | | | |
|---|---|---|---|
| 4,251,718 | 2/1981 | Cole | 219/505 |
| 4,450,496 | 5/1984 | Doljack et al. | 219/505 |
| 4,453,159 | 6/1984 | Huff et al. | 219/535 |
| 4,485,296 | 11/1984 | Ueda et al. | 219/505 |
| 4,503,322 | 3/1985 | Kishimoto et al. | 219/505 |
| 4,577,094 | 3/1986 | Mills | 219/505 |

Primary Examiner—M. H. Paschall
Attorney, Agent, or Firm—Shlesinger & Myers

[57] ABSTRACT

A parallel circuit heating tape (13) of the kind comprising two electrical power conductors (12,15) with low resistance relatively thin heating elements (16) between them which dissipate heat, the tape (13) comprising a temperature monitoring conductor (18,25) which extends alongside one of the power conductors (12,15), the temperature monitoring conductor (18,25) being separated from the one power conductor (18,25) by a substance (23,28) which insulates the two conductors (12,18; 15,25) from one another when the temperature is below a specified temperature or temperature within a transition temperature range, and provides a current path from one conductor (12,14) to the other (18,25) when the temperature is above the specified temperature or temperature within the transition temperature range.

12 Claims, 2 Drawing Sheets

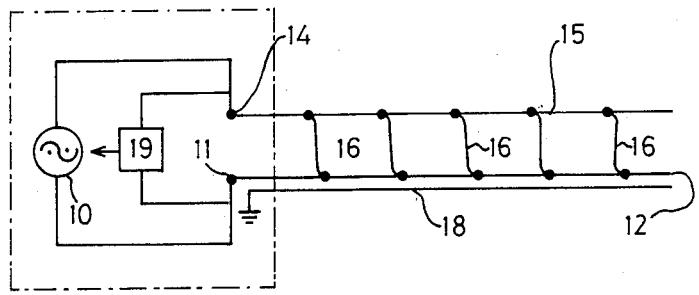
FIG 1
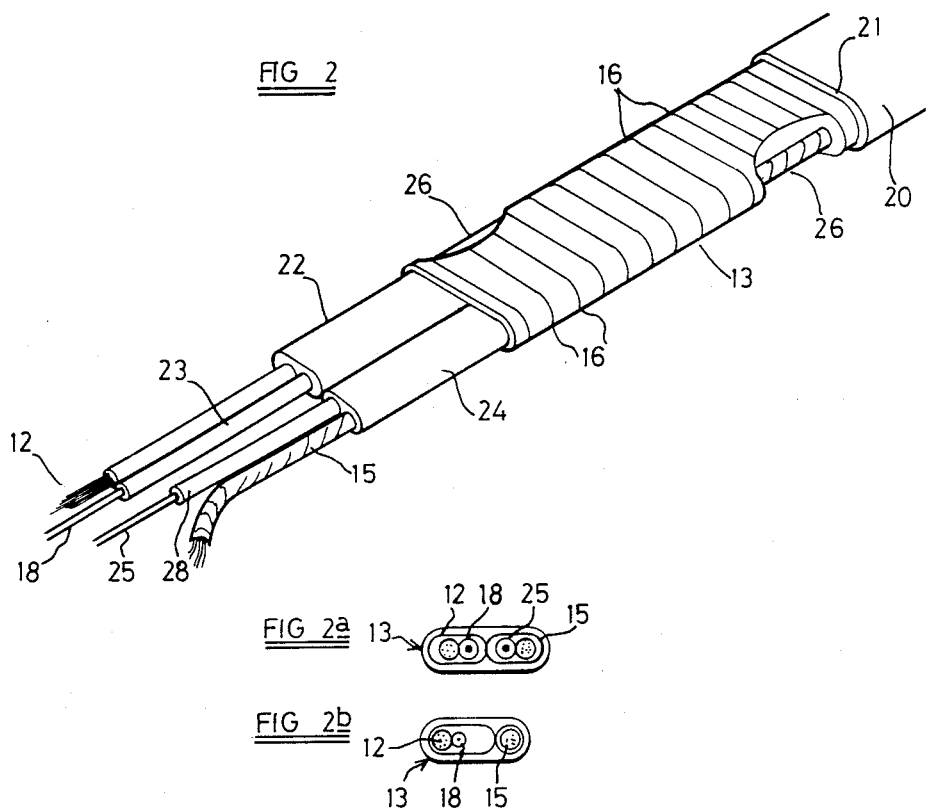
FIG 2
FIG 2a
FIG 2b

SELF-HEALING PARALLEL HEATING TAPE

DESCRIPTION OF THE INVENTION

This invention relates to parallel circuit heating tape comprising two electrical power conductors which extend generally alongside but spaced apart from one another, one of the conductors being connected in use to a live or positive AC or DC terminal respectively, and the other conductor being connected to a neutral or negative terminal, a plurality of relatively thin low resistant heating elements extending between the two conductors at spaced intervals along the length of the tape, the elements dissipating heat.

Such a heating tape will hereinafter be referred to as parallel circuit heating tape of the kind specified.

Parallel circuit heating tapes are used extensively for example, for the frost protection of water pipes, and for heating pipelines containing high viscosity liquids such as oil.

The parallel circuitry enables any length of the tape to be cut and connected to suitable external circuitry to achieve a heating effect.

The heating tape is usually covered with thermal insulation to reduce the energy requirement for maintaining the pipeline of the correct temperature which makes it necessary to calculate precisely the power rating per unit length of the heating tape in order that the safe maximum temperature of the heating tape is not exceeded.

It has proved preferable with a parallel circuit heating tape of the kind specified for the heating tape to be arranged in circuitry to provide a constant heat output, and for some form of temperature control to be provided along the length of the heating tape.

One proposal has been to provide a circuit within the heating tape, entirely separate from the power conductors and the resistance heating element, the circuit comprising a conductor which fuses at a designated temperature so as to break the electrical circuit. Such prior proposals certainly enable one to monitor when the temperature has exceeded a designated temperature, for example a safe temperature, but such circuits do not self-heal when the temperature falls below the designated temperature. It is necessary to replace the overheated section of the tape if temperature monitoring is again to be achieved.

It is an object of the present invention to provide a new or improved parallel circuit heating tape.

According to the invention I provide a parallel circuit heating tape of the kind specified comprising a temperature monitoring conductor which extends alongside one of the power conductors, the temperature monitoring conductor being separated from the one power conductor by a substance which insulates the two conductors from one another when the temperature is below a specified temperature or temperature within a transition temperature range, and provides a current path from one conductor to the other when the temperature is above the specified temperature or temperature within the transition temperature range.

Thus, when current flows to the temperature monitoring conductor, the temperature sensing is above the specified temperature or temperature within the transition temperature range. Furthermore, the substance used may be self-healing i.e. the substance again provides insulation between the temperature monitoring conductor and the power conductor when the temperature falls below the specified temperature or temperature within the transition temperature range.

It will be appreciated that some substances exhibit an abrupt change from insulator to conductor so that the substance is insulated to one side of a specific temperature, and is a conductor to the other side of the specific temperature. Other substances however exhibit a less abrupt change from insulator to conductor (and vice versa) and thus these are conductors on one side of a transition temperature range, and are insulators on the other side of the transition temperature range.

The substance used may comprise a salt such as sodium chlorate which is an insulator below a temperature within a transition temperature range, and is a conductor when above the temperature within the specified transition temperature range, in which case the temperature within the transition temperature range may be the melting point of the substance. Alternatively the substance may comprise an organic polymer or seeded polymer or chemical compound such as specially doped NTC polymeric insulator but these tend to exhibit a less abrupt change from insulator to conductor (and vice versa) than salts.

In all of these examples, when the temperature of the substance falls below the specified temperature or temperature of the transition temperature range, the substance again becomes non-conductive.

Preferably, the power conductors of the heating tape and the heating elements are constructed to carry current at mains voltages, there being no appreciable heat loss from the power conductors which are thus termed "cold".

The heating tape may comprise an extrusion of an insulating material such as a suitable polymer e.g. an elastomer based on silicone such as nitrile rubber, or fluropolymers or alternatively a thermoplastic or thermosetting polymer, depending on the temperature operating range of the heating tape. The power conductors and temperature monitoring conductor may be embedded in the extrusion with the one power conductor and temperature monitoring conductor alongside one another separated only by the substance which exhibits the change from insulator to conductor.

To connect a conventional parallel circuit heating tape to an external circuit, it is usual practice to cut the tape longitudinally for a distance from one end to separate the two power conductors and then to strip off any insulation such as the polymer extrusion from parts of the separated conductors to enable them to be connected to terminals of the external circuit. Of course, this longitudinal cutting will sever any resistance element extending between the power conductors at that end, so that the power conductors become what is known as "cold leads" from the external circuit to the heating tape.

The external terminals are usually provided within a connecting box and where the cold leads are bunched together, perhaps with other leads from other circuits, in order to enter the connecting box, there is the possibility of overheating occurring in a region where the leads are bunched together before entering the connecting box due to the current carried by the power conductors.

In a heating tape in accordance with the invention, overheating in this region can be monitored provided that the temperature monitoring conductor and its associated power conductor extend side-by-side separated only by said substance, from the heating tape into the connecting box.

It will be appreciated that in a heating tape of the kind specified in accordance with the invention, an indication is achieved immediately the temperature at any position along the length of the heating tape exceeds the specified temperature or temperature within the specified temperature transition range, and the exact position at which overheating has occurred can be sensed with a suitable detector, and any necessary remedial action taken.

Such a temperature monitoring conductor can thus be used to sense overheating as a protector for the item being heated, and for the heating tape itself. Thus, external circuitry may be provided to sense current leakage to the temperature monitoring conductor. For example the temperature monitoring conductor may be earthed and an earth leakage monitor may be provided between the two power conductors.

In another arrangement, a plurality of temperature monitoring conductors are provided each extending along the heating tape and being separated from an associated power conductor, or different power conductors, by substances which are sensitive to different temperatures, i.e. each substance being a conductor when at a temperature above or below a specified temperature or temperature in a transition temperature range unique to the temperature monitoring conductor, and being an insulator when at a temperature below the specified temperature or temperature within the transition temperature range unique to the temperature monitoring conductor. Thus the heating effect of the heating tape can be monitored against time, although one of the temperature monitoring conductors may be provided as an overheating protector as previously described.

Each temperature monitoring conductor may be connected to an external terminal of a temperature monitoring circuit which may be sensitive to electrical current carried in each and any one of the conductors.

The invention will now be described with the aide of the accompanying drawings in which:

FIG. 1 is a diagrammatic illustration of an electrical circuit including a heating tape in accordance with the invention;

FIG. 2 is a perspective illustrative view of one embodiment of heating tape in accordance with the invention;

FIG. 2a is an illustrative cross-sectional view through the heating tape of FIG. 2 taken on the line a-a;

FIG. 2b is an illustrative cross-sectional view similar to the view of FIG. 2a but of a modified tape;

Figure 3:
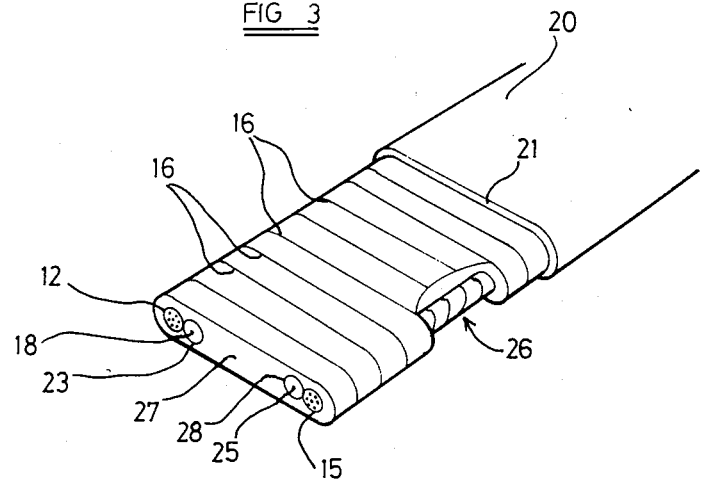
FIG. 3 is an illustrative perspective view of a second embodiment of a heating tape in accordance with the invention.

Referring to FIG. 1, an electrical circuit includes a power supply 10 which supplies alternating current at mains voltages to a live terminal 11 which is connected to a power conductor 12 of an electrical heating tape 13, the neutral of the supply being connected to a neutral terminal 14 which is connected to a second power conductor 15 of the tape 13.

Relatively thin high resistance heating elements 16 extend between the power conductors 12 and 15 over the length of the tape 13 and dissipate heat.

Within the heating tape 13 as hereinafter described, a temperature monitoring conductor 18 is provided, and between the terminals 11 and 14, an earth leakage monitor 19 is provided so that any leakage of current for example from either of the conductors 12 and 15 to earth, for example via the temperature monitoring conductor 18 can be sensed. The earth leakage monitor may be a circuit breaker arranged to disconnect the power supply 10 from the terminals 11 and 14 if an overheating condition, occurs as hereinafter described.

Referring now to FIGS. 2 and 2a, one example of a suitable construction of heating tape 13 is shown.

The heating tape 13 comprises an outer sheath 20 preferably of a water resistant material such as rubber in which is contained a layer of insulation 21.

The power conductor 12 comprises braided wire contained within an insulating sheath 22 along with the temperature monitoring conductor 18, the power conductor 12 and temperature monitoring conductor 18 being separated by a substance provided as a coating on the temperature monitoring conductor 18 as shown at 23.

The other power conductor 15 is also contained within its own sheath 24 along with a second temperature monitoring conductor 25, the temperature monitoring conductor 25 having a coating 28 of a substance different to the substance providing coating 23, and the power conductor 15 and temperature monitoring conductor 25 being separated from one another only by the substance 28.

It can be seen that the power conductors 12 and 15 are outermost in the tape 13. A plurality of heating elements 16 wound around the sheaths 22, 24, and are electrically connected between the power conductors 12 and 15 at positions 26 along the length of the heating tape, so that current passes from the conductor 12 to conductor 15 via the elements 16.

It can be seen from FIG. 2 that the elements 16 are relatively thin but are high resistance wires, so that the elements 16 dissipate heat from the heating tape 13.

The layer of insulation 21 not only protects against current leakage from the elements 16, but preferably is a good thermal conductor to enable heat generated by the heating tape 13 to be easily dissipated to a pipeline for example around which the tape may be wrapped, to conserve and minimise the amount of energy required to maintain the temperature of the pipeline, or liquid within the pipeline.

The substance 23 which lies alongside the power conductor 12 is an insulator when at a temperature below a specified tempeature so that current cannot flow from the power conductor 12 to the temperature monitoring conductor 18 when the temperature of the substance 23 is below the specified temperature.

However, as the temperature of the substance 23 rises above the specified temperature, the substance 23 becomes a conductor so that current can then pass from the power conductor 12 to the temperature monitoring conductor 18. When the heating tape 13 is in a circuit such as that shown in FIG. 1, it will be appreciated that current will therefore leak from the power conductor 12 to earth, and this will cause the earth leakage monitor 19 either to disconnect the power supply to the heating element 13 when the monitor 19 is a circuit breaker, or in another circuit, if desired when the substance 23 becomes conductive at the specified temperature, this may simply give an indication to an operator that a specified temperature has been attained by the heating tape 13.

The substance 28 of the second temperature monitoring conductor 25 is preferably a different substance to the substance 23, or at least is sensitive to a different temperature so that the substance 28 is an insulator below a specified temperature different to the specified temperature at which the substance 23 becomes a conductor. At the second specified temperature, the substance 26 becomes a conductor, and if desired in a suitable circuit may be sensed so as to give an operator an indication that the second specified temperature has been attained by the heating tape.

Thus, the temperature monitoring conductors 18 and 25 can be used to monitor the heating effect of the heating tape 13 against time although preferably, at least one of the temperature monitoring conductors 18, 25 comprises an overheating protector which senses a specified maximum temperature at which the heating effect of the heating tape will be cut off due to the effect of for example, on earth leakage circuit beaker 19 or other such device, cutting off the power supply 10 to the heating tape 13.

In FIG. 2b, an arrangement similar to that shown in FIGS. 2 and 2a is shown, but only one temperature monitoring conductor 18 is provided adjacent the power conductor 12.

Referring now to FIG. 3, a second embodiment of a heating tape in accordance with the invention is shown. Similar parts to the heating tape 13 already described are given the same reference numeral.

With this heating tape, an extrusion 27 of an insulating polymer is provided, and embedded within the extrusion 27 is a first power conductor 12 and a second power conductor 15, heating elements 16 extending between the conductors 12 and 15 and being electrically connected thereto at regions 26 along the heating tape.

The extrusion 27 is again provided within a sheath 20 of a protective material, which may again comprise an extrusion, and a layer of insulation 21 is provided between the sheath 20 and the heating element 16 but preferably the sheath 20 and insulation 21 are provided by the same extrusion.

Embedded in the extrusion 27 alongside the power conductor 12, is a first temperature monitoring conductor 18 which is separated from the conductor 12 only by a coating of a substance 23 of a similar nature to the substance 23 already described with relation to FIG. 2.

Embedded in the extrusion 27 alongside the power conductor 15 is a second temperature monitoring conductor 25 which is separated from the conductor 15 only by a coating of substance 28.

Thus the tape of FIG. 3 can be connected in a circuit in the same manner as the heating tape of FIG. 2 previously described, although the heating tape is of alternative construction.

Figure 3A:
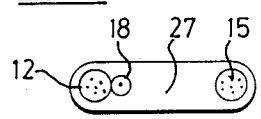
FIGS. 3a and 3b are cross-sections of the heating tape similar to the tape of FIG. 3, but modified.
Figure 3B:
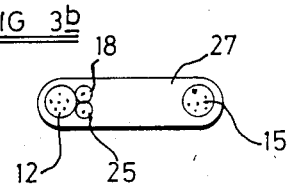

In FIG. 3a, an extrusion 27 has embedded in it only a single temperature monitoring conductor 18 alongside a power conductor 12 whilst in FIG. 3b, a pair of temperature monitoring conductors 18 and 25 are each embedded in an extrusion 27 alongside the same power conductor 12, the temperature monitoring conductor 18 being separated from the power conductor 12 by a coating 23 of substance whereas the second temperature monitoring conductor 25 is separated from the power conductor 12 by coating 28 of substance.

In each of the embodiments described above suitable substances are as indicated by Table 1 below which illustrate the transition temperature or transition temperature range for each different substance, at which the substance changes from being an insulator to being a conductor. Where the substances comprises salts, the specified temperatures may comprise the melting points of the salts.

TABLE 1

| Substance | Temperature within a Specified temperature range (°C.) |
| --- | --- |
| Ammonium Nitrate | 170 |
| 10/1 Mixture Potassium Nitrate/Sodium Nitrite | 192 |
| Sodium Nitrate | 310 |
| Sodium Chlorate | 255 |
| Sodium Nitrite | 271 |
| Potassium Nitrate | 338 |
| Potassium Nitrite | 440 |
| Potassium Bisulphate | 219 |
| Silver Nitrate | 210 |
| Potassium Dichromate | 398 |
| Ammonium Thiocyanate | 146 |
| Lithium Nitrate | 250 |
| Glass seeded with Gold | 600 |

In an alternative embodiment, the substances providing coatings 23 and 28 may comprise polymers or seeded polymers or other chemical compounds such as specially doped NTC polymeric insulators which exhibit a less abrupt change from insulator to conductor, than the salts or even pure glass which becomes a conductor when molten.

Various modifications are possible without departing from the scope of the invention.

As mentioned above, the circuit shown in FIG. 1 is purely on example, where a single temperature monitoring conductor 18 is provided to sense overheating of the heating tape 13. Any other electric circuit to sense current flowing in the temperature monitoring conductors 18 and 25 can be provided i.e. the power supply need not be entirely cut off as an overheated temperature is sensed.

For example, in some applications it is desirable to provide an arrangement in which the current supply of the overheated section of heating tape only is cut off or reduced, when a warning has been provided, for example to an operator of the overheating.

This may be achieved by inserting a positive temperature coefficient (PTC) material between the heating elements 16 and the power conductor 12,15, in the regions indicated at 26.

Thus as the temperature rises in any section of the tape, the PTC material will become less conductive and thus will tend to reduce the current and hence the heat produced by the heating elements 16 in the adjacent overheated section of the tape.

Thus the heating effect of the tape overall need not be interrupted, but repairs to the overheated section of the tape can be delayed until convenient, without any risk of danger due to the overheated section, or any risk of total destruction of the tape in the overheated region.

Suitable PTC materials are ceramics doped with Barium Titinate, or PTC silicone elastomers, or thermoplastic PTC materials, the actual material being chosen depending on the maximum temperature to which the tape is to be subjected, and the required characteristic of the PTC material.

Table 2 below gives a temperature range in which suitable PTC material would reduce the current supplied to the heating elements 16, and the upper temperature of the range indicating the maximum temperature to which the material should be subjected.

TABLE 2

| Material | Temperature range |
| --- | --- |
| Thermoplastic PTC materials | approx. 80° C.–150° C. |
| Silicone elastomers | approx. 100° C.–200° C. |
| Ceramic doped materials | approx. 80° C.–300° C. |

The heating elements 16 need not be connected to the power conductors 12 and 15 as described but other arrangements are possible.

In each of the arrangements, the heating tape 13 is of a generally flat shape, but it will be appreciated that more circular or even entirely different configurations of heating tape are possible.

I claim:

1. A parallel heating tape, comprising:
   (a) two electrical power conductors extending generally alongside but spaced apart from one another;
   (b) a plurality of heating elements extending between and being electrically connected to each of the two power conductors along the length of tape;
   (c) the heating elements each being thinner and of higher resistance than the power conductors and providing a current path from one of the power conductors to the other whereby the heating elements dissipate heat;
   (d) a temperature monitoring conductor extending alongside one of the power conductors but being separated from the respective power conductor by a substance which electrically insulates the temperature monitoring conductor from the power conductor when the temperature is below one of the specified temperatures and a temperature within a transition temperature range; and
   (e) the substance providing a current path between the power conductor and the temperature monitoring conductor when the temperature is above the respective one of the specified temperature and a temperature within the transition temperature range, and the substance again insulating the power conductor from the temperature monitoring conductor when the temperature falls below the respective specified temperature or a temperature within the transition temperature range.

2. A heating tape according to claim 1 wherein the substance which separates the two conductors again provides insulation between the temperature monitoring conductor and the power conductor when the temperature falls below the specified temperature or temperature within the transition temperature range.

3. A heating tape according to claim 1 wherein the substance comprises a salt which is an electrical insulator below a temperature within a transition temperature range, and is a conductor when above the temperature within the specified transition temperature range, the temperature within the transition temperature range being the melting point of the substance.

4. A heating tape according to claim 1 wherein the substance is selected from a group consisting of an organic polymer, a seeded polymer, and a chemical compound.

5. A tape according to claim 4 wherein the substance comprises a doped negative temperature coefficient polymeric insulator.

6. A heating tape according to claim 1 which comprise an extrusion of an electrical insulating material with the power conductors and temperature monitoring conductor embedded in the extrusion with the one power conductor and temperature monitoring conductor alongside one another separated only by the substance which exhibits the change from insulator to conductor.

7. A heating tape according to claim 6 wherein the extrusion is of a polymer.

8. A heating tape according to claim 1 wherein external circuitry is provided to sense current leakage to the temperature monitoring conductor.

9. A heating tape according to claim 8 wherein the temperature monitoring conductor is earthed and an earth leakage monitor is provided between the two power conductors.

10. A heating tape according to claim 1 wherein a plurality of temperature monitoring conductors are provided each extending along the heating tape and being separated from one power conductor, or different power conductors, by substances which are sensitive to different temperatures.

11. A heating tape according to claim 10 wherein one of the temperature monitoring conductors is provided as an overheating protector.

12. A heating tape according to claim 10 wherein each temperature monitoring conductor is connected to an external terminal of a temperature monitoring circuit which is sensitive to electrical current carried in each and any one of the conductors.

* * * * *